(12) United States Patent
Fujita et al.

(10) Patent No.: US 6,738,679 B2
(45) Date of Patent: May 18, 2004

(54) POSITIONAL CONTROL SYSTEM AND POSITIONAL CONTROL METHOD

(75) Inventors: Jun Fujita, Shizuoka (JP); Minoru Hamamura, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 393 days.

(21) Appl. No.: 09/844,284

(22) Filed: Apr. 30, 2001

(65) Prior Publication Data

US 2001/0054876 A1 Dec. 27, 2001

(30) Foreign Application Priority Data

May 8, 2000 (JP) .......................... 2000-134377

(51) Int. Cl.[7] .............................. G05B 19/18
(52) U.S. Cl. .................... 700/56; 700/57; 700/186; 700/189; 318/561; 318/568.15; 318/569; 318/573; 318/600; 318/638
(58) Field of Search ............................ 700/56, 57, 186, 700/189; 318/561, 568.15, 569, 573, 600, 638

(56) References Cited

U.S. PATENT DOCUMENTS

| 4,359,675 A | * | 11/1982 | Miller, III ............... 318/603 |
| 4,497,255 A | * | 2/1985 | Theurer ..................... 104/8 |
| 4,748,393 A | * | 5/1988 | Fincher et al. ............ 318/638 |
| 5,479,079 A | * | 12/1995 | Jeong et al. ......... 318/568.12 |
| 6,153,997 A | * | 11/2000 | Kobayashi et al. ....... 318/560 |

* cited by examiner

Primary Examiner—Ramesh Patel
Assistant Examiner—Thomas Pham
(74) Attorney, Agent, or Firm—Pillsbury Winthrop LLP

(57) ABSTRACT

A positional control system wherein the position of the controlled object connected to a drive is controlled to a variable target or desired position. A period is determined which starts with a detection of a reversal in the direction of the feed of a positional command Pr as well as the detection of a stoppage of a table 104 as a controlled object and which ends with a detection of the re-start of the movement of the table 104. During the period, a correction amount for correcting a positional deviation E is issued.

16 Claims, 8 Drawing Sheets

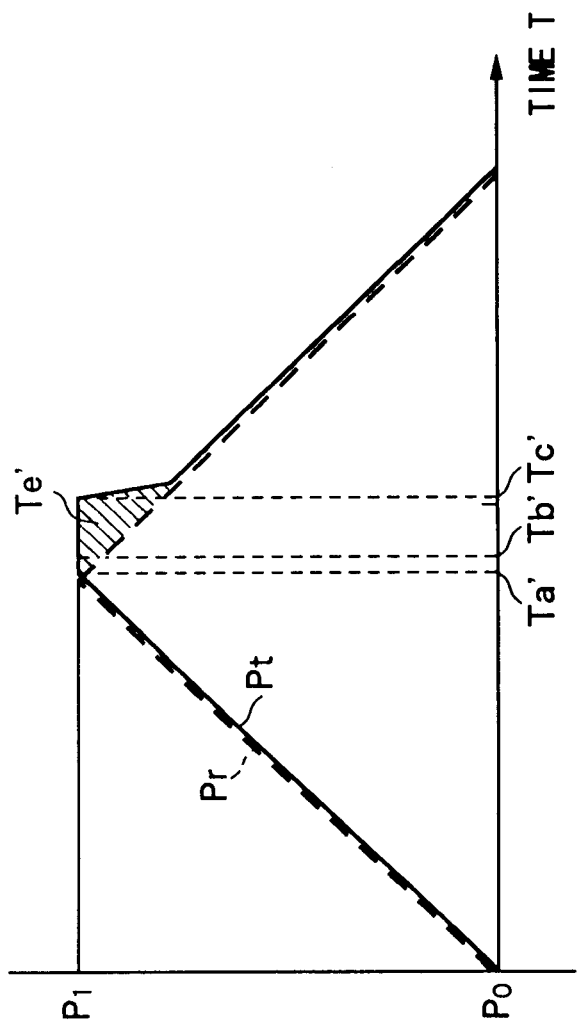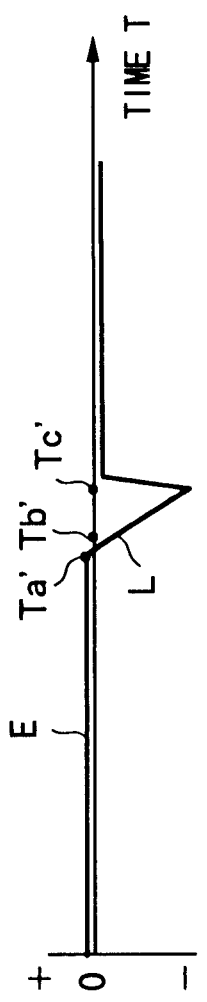
FIG.5A (PRIOR ART) POSITIONAL COMMAND Pr AND TABLE POSITION Pt
FIG.5B (PRIOR ART) POSITIONAL DEVIATION E WITH NO CORRECTION

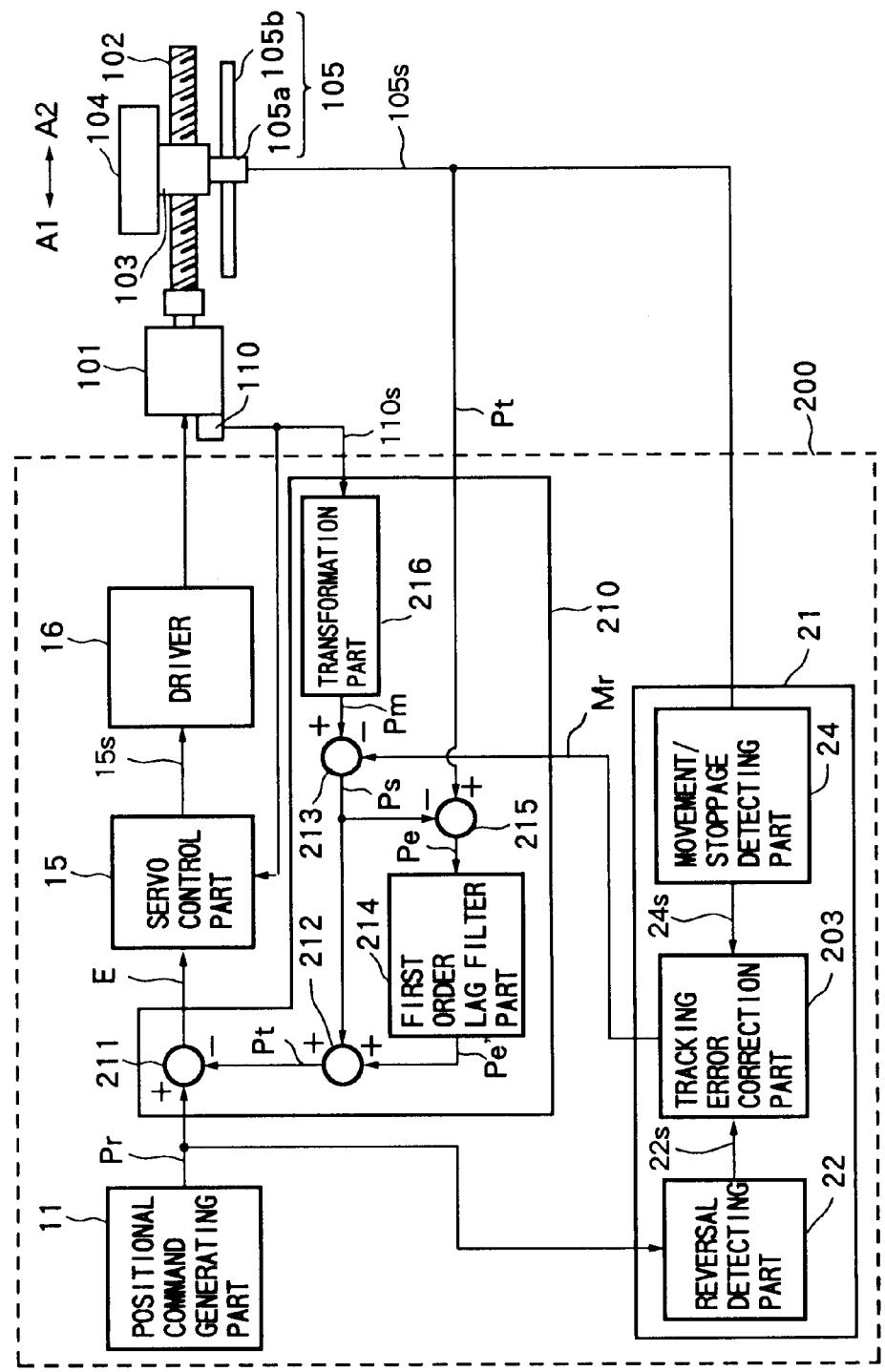

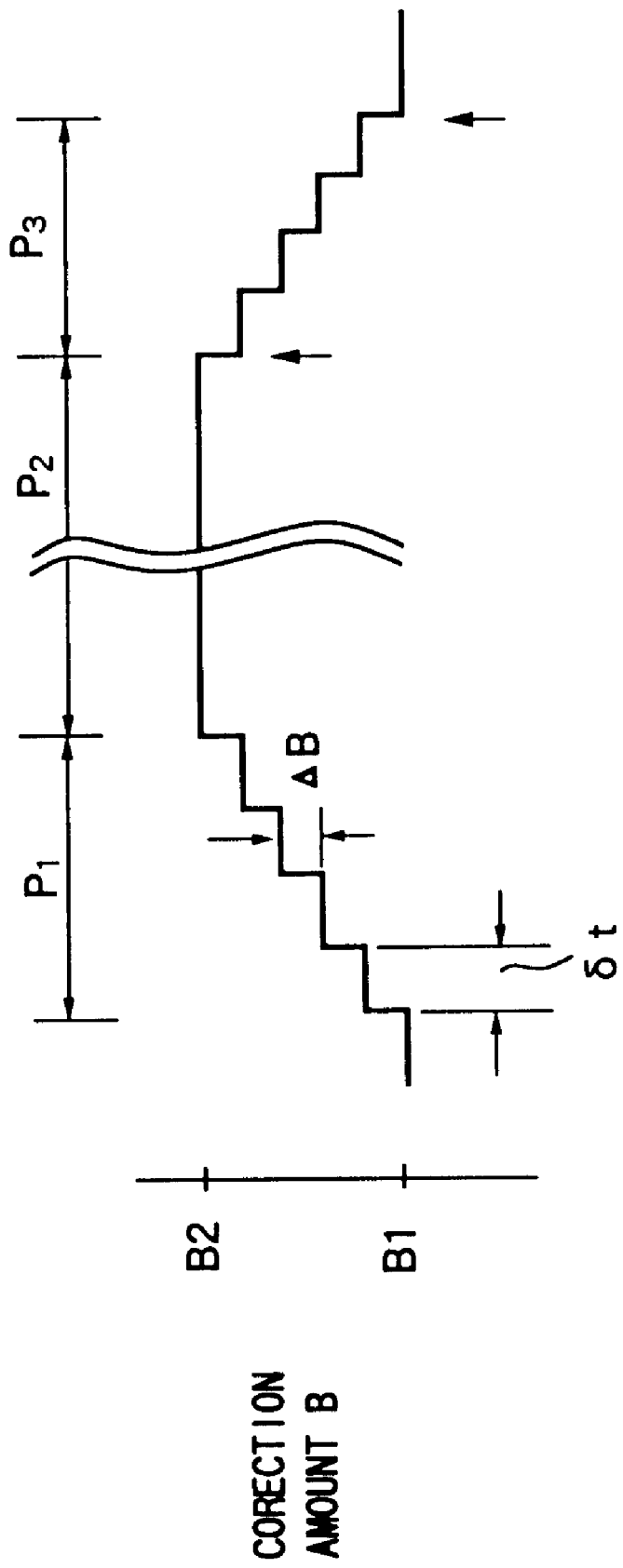

POSITIONAL CONTROL SYSTEM AND POSITIONAL CONTROL METHOD

BACKGROUND OF THE INVENTION

1. Field of the Invention

The present invention relates to a system and method for controlling a position in a controlled object in a mechanical equipment, such as a numerical controlled (NC) machine tool.

2. Description of Related Art

A position control in a controlled object, such as a work table and a work cutter in a NC machine tool is, in general, done by controlling a rotating amount of a servomotor connected to the controlled object via a transmission mechanism, which is, for example, constructed by a rack-and-pinion mechanism or a ball screw-and-nut mechanism.

A positional control in a controlled object, of a semi-closed-loop type, a full-closed-loop type and a hybrid control type is known.

In the semi-closed-loop positional control, a servo control system is constructed such that a detection of a rotating position of a servomotor is done by, for example, using a detector such as a rotary encoder. The detected rotating position of the servomotor is, then, transformed into a position of the controlled object. The transformed rotating position is, finally, subjected to a feedback to a positional command for controlling a rotating amount of the servomotor.

In the full-closed-loop positional control, a servo control system is constructed such that a linear type measuring scale is, for example, directly connected to a controlled object such as a table. The position of the controlled object as detected by the linear type measuring scale is subjected to a feedback to a positional command for controlling the rotating amount of the servomotor.

In the hybrid control positional control, a servo control system is constructed such that a rotating position of a servomotor and a position of the controlled object are both detected. A rotating position of the servomotor transformed to the position of the controlled object is subjected to a feedback to the positional command while a difference between a position of the controlled object and the transformed rotating position of the servomotor is, first, subjected to a filtering by a first order lag filter and is, then, subjected to a feedback to the positional command.

When a non-linear characteristic such as a backlash or a friction exists in a transmission mechanism arranged between the servomotor and the controlled object, a phenomenon is generated, wherein a switching of the direction of the movement of the controlled object causes the servomotor to be moved, while the controlled object is maintained to be unmoved. Such a phenomenon is called as a lost motion, by which the controlled object is not able to respond quickly to the positional command.

A method for correcting the tracking error is known, which is called as a back lash correction, wherein, upon a detection of the switching in the direction of the movement in the positional command, a correction in the control command to the servomotor is done, so that the lost motion is quickly removed, thereby restricting the response error from the positional command in the controlled object.

In the above mentioned semi-closed-loop positional control, the position of the controlled object is indirectly obtained from the rotating position of the servomotor, i.e., a direct control is not done. As a result, a backlash correction does not cause any offset to be generated in the controlled object.

Contrary to this, in the above mentioned full-closed-loop positional control, an execution of the above mentioned a backlash correction during a reversal in a feedback value as obtained by the linear scale causes an offset to be generated in the position of the controlled object due to the fact that a positional information of the controlled object is also corrected.

As far as the hybrid control type is concerned, not only a feedback value from the linear scale but also a feed back value of a servomotor are used. Therefore, an occurrence of the offset in the controlled position of the controlled object is prevented by executing a correction of the feedback value.

However, in the hybrid control positional control, a control is done in such a manner that a coincidence is obtained between the target position and the detected position of the linear scale. As a result, even a small change of a feedback value of the position of the controlled object as obtained by the linear scale in a direction opposite to the direction of occurrence of the lost motion causes the servomotor to move the controlled object beyond the range of the lost motion irrespective of a fact that the positional command is unchanged. A stoppage of the controlled object is obtained when the coincidence between the feedback value of the position of the controlled object and the positional command is obtained, thereby canceling the lost motion. A detection of the reversal in the moved direction of the positional command from this condition causes, however, a phenomenon to be generated, wherein a momental deviation of the controlled object from the target position is generated due to the operation of the backlash correction device. In a system where the control object is moved along an arc shaped pass by employing a orthogonal double axis control, the above-mentioned phenomenon may cause a difficulty to be occurred such that a trajectory of the controlled object is deviated inwardly from the desired arc shaped pass at so-called quadrant switching points.

SUMMARY OF THE INVENTION

An object of the present invention is to provide a position control system and method of a type wherein a position of a controlled object is directly detected and is subjected to a feedback operation for controlling the position of the controlled object, capable of overcoming the above mentioned difficulties in the prior art.

Another object of the present invention is to provide a position control system and method of the above type, capable of restricting a tracking error in the controlled object as generated upon a reversal in the direction of the feed of the controlled object.

Still another object the present invention is to provide a position control system and method of the above type, capable of preventing any offset from being generated in controlled position of the controlled object.

According to the first aspect of the present invention, there is provided a positional control system comprising: a controlled object; driving means connected to the controlled object; setting means for setting a variable target or desired position of the controlled object; a control command generating means for generating a control command in accordance with said variable target position; a position sensor arranged on said controlled object for detecting a position of the controlled object; a deviation generating means for generating a deviation from said control command and a detected position of the controlled object; a serve control means for generating, in accordance with the deviation, a manipulated variable issued to said driving means for causing said controlled object to follow said variable target position; and, a tracking error correction means operated in a period which is commenced when a direction in the feed in the variable target position is reversed and when the controlled objected is stopped and which is ceased when the movement of the controlled object is re-started, for correcting the deviation, so that a tracking error of said controlled object with respect to said variable target position as generated by said reversal in the direction of the feed is restricted.

Preferably, said tracking error correction means comprise: a reversal detector part detecting a reversal in direction of feed; a movement/stoppage detector part for detecting if the controlled object is moved or stopped; and, a tracking error correcting part for issuing a correcting amount for correcting said deviation in accordance with signals from said reversal detector and said movement/stoppage detector.

Preferably, said tracking error correcting part holds, in accordance with the direction of the reverse of the feed, a first and second correction amounts of opposed signs of the same absolute value.

Preferably, said movement/stoppage detector part detects, based on the signal from said position sensor, detects if the controlled object is moved or stopped.

According to the second aspect of the present invention, a position control method is also provided, comprising the steps of: providing a controlled object; providing driving means connected to the controlled object; setting a variable target or desired position of the controlled object; generating control command in accordance with said variable target position; providing a position sensor in a controlled object; detecting a position of the controlled object by said position sensor; generating a deviation from said control command and a detected position of the controlled object; effecting a servo-control by generating, in accordance with the deviation, a manipulated variable issued to said driving means for causing said controlled object to follow said variable target position; and, correcting said deviation during a period which is commenced when a direction in the feed in the variable target position is reversed and when the controlled objected is stopped and which is ceased when the movement of the controlled object is re-started, so that a tracking error of said controlled object with respect to said variable target position as generated by said reversal in the direction of the feed is restricted.

In the system or method in the first aspect of the present invention, the driving means is operated in accordance with the variable target or desired position, so that the controlled object connected to the drive means is controlled to the variable target position. A backlash between the drive means and the controlled object and a non-linearity such as a friction can not be avoided, which may causes a lost motion to be generated, by which, irrespective of a change in the direction of the operation of the driving means, the controlled object keeps its stopped condition. According to the present invention, when the direction in feed of the variable target position and a stoppage of the controlled object are detected, a correction of a control deviation is done only at a period where the controlled object is stopped, thereby restricting a tracking error of the controlled object. Furthermore, according to the present invention, the correction is done during the stoppage of the controlled object. As a result, any change in the position sensor on the controlled object does not occur, so that any information as to a change in the detected position is not included in the control deviation prior to the execution of the correction. As a result, an information of the detected position of the controlled object is not varied irrespective of the correction of the control deviation. Thus, any offset in the controlled position of the controlled object is not generated when the movement of the controlled object is re-restarted.

According to a third aspect of the present invention, there is provided a positional control system comprising: a controlled object; a driving means connected to the controlled object; a setting means for setting a variable target or desired position of the controlled object; a control command generating means for generating a control command in accordance with said variable target position; a first position sensor on said controlled object for detecting a position of the controlled object; a second position sensor arranged on said driving means for detecting a driving position of the driving means; a deviation generating means for generating control deviation of the controlled object from said control command, the detected position of the controlled object and detected driving position of the driving means; a serve control means for generating, in accordance with the control deviation, a manipulated variable issued to said driving means for causing said controlled object to follow said variable target position; and, a tracking error correction means operated in a period which is commenced when a direction in the feed in the variable target position is reversed and when the controlled objected is stopped and which is ceased when the movement of the controlled object is re-started, for modifying a correction amount for correcting said detected driving position, so that a tracking error of said controlled object with respect to said variable target position as generated by said reversal in the direction of the feed is restricted.

Preferably, said tracking error correction means comprise: a reversal detector part detecting a reversal in direction of feed; a movement/stoppage detector part for detecting if the controlled object is moved or stopped; and, a tracking error correcting part for increasing or decreasing a correcting amount for correcting said detected driving position in accordance with signals from said reversal detector part and said movement/stoppage detector part.

Preferably, said tracking error correcting part effects a periodical modification of a predetermined amount of the correcting amount for correcting the detected driving position when a reversal in the direction of the feed is detected by the reversal detecting part as well as when the stoppage of the controlled object is detected by said movement/stoppage detector part, said modification being ceased when a re-start of the controlled object is detected by said movement/stoppage detector part.

Preferably, said movement/stoppage detector part effects, based on the signal from said position sensor, detection if the controlled object is moved or stopped.

According to the fourth aspect of the present invention, there is provided a position control method is also provided, comprising the steps of: providing a controlled object; providing driving means connected to the controlled object; setting a variable target or desired position of the controlled object; generating control command in accordance with said variable target position; providing a position sensor in a controlled object; detecting a position of the controlled object by said position sensor; providing a position sensor in the driving means; detecting a driving position of the driving means by the driving position sensor; generating a deviation from said control command and a detected driving position of the driving means; effecting a servo-control by generating, in accordance with the deviation, a manipulated variable issued to said driving means for causing said controlled object to follow said variable target position; and, modifying correcting amount for correcting the detected driving position during a period which is commenced when a direction in the feed in the variable target position is reversed and when the controlled objected is stopped and which is ceased when the movement of the controlled object is re-started, so that a tracking error of said controlled object with respect to said variable target position as generated by said reverse in the direction of the feed is restricted.

In the second aspect of the present invention, the driving means is operated in accordance with the variable target or desired position, so that the controlled object connected to the driving means is controlled to the variable target position. A reversal in the feed due to the change in the variable target position may cause the lost motion to be generated. However, according to the this aspect of the invention, when a reversal in the feed in the variable target position and the stoppage of the controlled object is detected, a correcting amount for correcting the detected driving position is modified, so that the tracking error in the controlled object is restricted. Furthermore, in this aspect of the present invention, a correction of the detected driving position is done and the corrected amount of modified value is always used for correcting the detected driving position. Thus, any modification of an information in the position of the controlled object does not occur, so that any generation of offset in the controlled position of the controlled object is prevented.

BRIEF DESCRIPTION OF THE DRAWINGS

These and other objects and features of the present invention will become clearer from the following description of the preferred embodiments given with reference to the accompanying drawings, in which:

FIG. 5A is a graph illustrating a positional command in the prior art;

FIG. 5B is a graph illustrating a positional deviation in the prior art;

FIG. 6 is a view of a positional control system in a second embodiment of the present invention;

FIG. 8 is a graph illustrating a change in a correction amount in the second embodiment of the present invention.

DESCRIPTION OF THE PREFERRED EMBODIMENTS

Now, preferred embodiments of the present invention will be described with reference to the accompanying drawings.

First Embodiment

Figure 1:
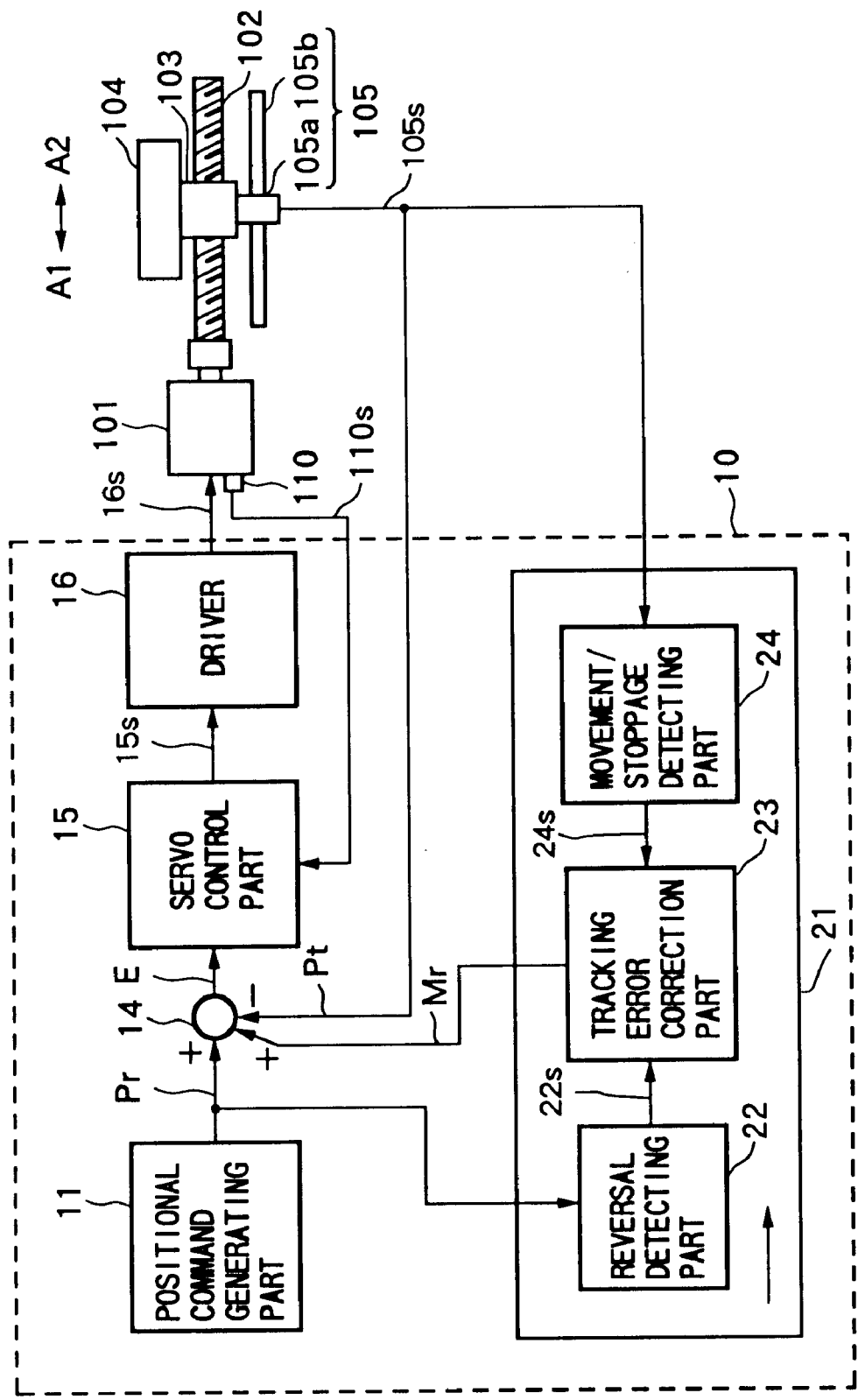
FIG. 1 is a view illustrating a construction of a positional control system according to the first embodiment of the present invention.

FIG. 1 illustrates a construction of a position control system according to a first embodiment of the present invention.

In FIG. 1, the position control system shown by a reference numeral 1 is provided with: a position control part 10; a servomotor 101; a rotating position detector 110 of an optical or magnetic type connected to the servomotor 101; a ball screw shaft 102, which is connected to the servomotor 101 and which has, at the outer periphery of the shaft, a screw threaded part; a movable member 103, which has a screwed bore in a screw engagement with the screw threaded part of the ball screw shaft 102; a table 104, which is connected to the movable member 103 and which is held by a guide member (not shown) so as to be moved in directions of the axial movement of the ball shaft 102 as shown by arrows A1 and A2, and; a linear scale unit 105b, which is constructed by a detector 105a fixedly connected to the table 104 and a scale 105b extending along the directions A1 and A2.

In the invention as claimed, the table 104 corresponds to the controlled object or controlled system, while the linear scale 105 corresponds to a position detector.

The ball screw shaft 102 is in a screw engagement with the screw bore of the movable member 103. When the ball screw shaft 102 is rotated, the rotating movement of the ball screw shaft 102 is transmitted to a straight movement of the movable member 103. As result, a straight movement of the table 104 is obtained.

Between the ball screw shaft 102 and the movable member 103, non-linear effects such as a mechanical error such as a backlash and a friction exist. As a result of such non-linear effects, a so-called lost motion is generated in such a situation where, just after rotating movement of the ball screw shaft 102 in on direction for generating movement of the table 104 in the direction of the arrow A2, a rotating movement of the opposite direction is followed for generating the movement of the table 104 in the opposite direction as shown by the arrow A1. In the occurrence of such a lost motion, any movement of the table 104 is not obtained, i.e., table 104 is kept unmoved, irrespective of the actual switching of the direction of the movement of the ball screw shaft 102.

In the linear scale 105, its detecting part 105a connected to the table 104 detects, under a magnetic or optical basis, the position with respect to the scale 105b and issues a feedback signal 105s to the position control device 10. This detection signal 105s is, for example, a pulse signal in accordance with the displacement of the table 104.

The rotating position detector 110 detects a rotating position of the servomotor 101 and its detection signal 110s is subjected to a feedback to the servo control part 15.

The position control device 10 is provided with a positional command generating part 11, a control deviation generating part 14, a servo-controller part 15, a driving part 16 and a correcting part 21. In the claimed invention, the positional command generating part 11 is generalized as command output means, the deviation generating part 14 as deviation generating means, the servo controlling part 15 plus the driving part 16 as servo control means and the correcting part 21 as tracking error correcting means.

The positional command generating part 11 issue a positional command Pr, which corresponds to the variable or desired target position, to which the table is to be moved. The positional command Pr is given by a pulse amount.

The deviation generating part 14 functions to generate a deviation (control error) E, which is obtained by the positional command Pr from the positional command generating part 11 and the feedback signal 105s from the linear scale 105. The deviation E is issued to the servo controlling part 15. In more detail, a subtraction, from the position control command Pr, of the feedback signal 105s as the detecting position of the table 104 is done for calculating the positional deviation.

The servo-controlling part 15 issues a manipulated variable or controlled input 15s, which, based on the positional deviation E from the deviation generating part 14, causes the position of the table 104 to follow the change in the positional command Pr and to conform to thereto. In more detail, the servo controlling part 15 includes a velocity loop as well as an electric current loop. The positional deviation E is, after subjected to a proportional action in accordance with the value of the position loop gain, issued as a velocity command with respect to the velocity loop. In the velocity loop, with respect to a deviation of the velocity command to a difference value (velocity feedback signal) of the feedback signal 110s from the rotating position detector 110, a proportional control action as well as an integral control action are, for example, applied, thereby obtaining a torque command, which is issued to the electric current loop. In the electric current loop, with respect to the deviation of the output torque signal of the servomotor converted from a driving current of the servomotor 101, from the above mentioned torque command, a proportional control action is carried out, thereby obtaining an electric current command, which is converted to a predetermined signal 15s, which is output to the driver part 16.

The driver part 16 issues, to the servomotor 101, as a manipulated variable 16s, a drive electric current, which is amplified in accordance with signal 15s input from the servo control part 15.

The correction part 21 includes a reversal detecting part 22, a tracking error correction part 23 and a detecting part for detecting a movement and/or stoppage. The reversal detecting part 22 receives the positional command Pr from the positional command generating part 11 and detects the reversal in the direction of the feed in the positional command Pr, so that a reversal detecting signal 22s is issued to the tracking error correcting part 23.

Furthermore, the reversal detecting signal 22s includes an information for specifying the direction of the reversal, i.e. specifying if the direction of the reversal is from the direction of the feed as shown by the arrow A2 to the direction as shown by the arrow A1 or from the direction of the feed as shown by the arrow A1 to the direction as shown by the arrow A2. In more detail, the reversal detecting part 22 calculates a difference value of the positional command Pr between sampling times and generates a reversal detecting signal 22s when a reversal of the sign in the deference value is detected. In this embodiment, the reversal detecting signal 22a is a binary signal. The signal is high level (ON) when the reversal is detected and is low level (OFF) when the reversal is not detected.

The movement/stoppage detecting part 24 receives the feedback signal 105s from the linear scale 105, detects, from this feedback signal, if the table 104 is under moved condition or is under stopped condition, and issues a movement/stoppage signal 24s to the tracking error correction part 23. In more detail, an amount of change in the feedback signal 105s from the linear scale 105 in a predetermined time is, first, compared with a predetermined threshold value. Next, when the amount of the change is smaller than the threshold value, a determination of the stopped condition is obtained. Contrary to this, when the amount of the change is larger than the threshold value, a determination of the moved condition is obtained. When the movement/stoppage signal can, for example, be constructed by a binary signal. A determination of the stoppage condition may cause the movement/stoppage signal to be made OFF. In this case, a determination of the moved condition causes the movement/stoppage signal to be made ON.

The tracking error correction part 23 responds to with the detecting signal of the reversal detecting part 22 and the detected condition of the detecting signal 24s of the movement/stoppage detecting part 24 and issues a correction command Mr for correcting the deviation to the deviation generating part 14. In more detail, the tracking error correction part 23 issues, after the input of the reversal detecting signal 22s, a correction signal Mr to the deviation generating part 14 during the period which starts from the timing when the movement/stoppage signal 24s from the movement/stoppage detecting part 24 is made OFF, i.e., when the table 104 is made stopped and which ends at the timing when the movement/stoppage signal is made ON, i.e., when the movement of the table is re-started.

In a situation of the occurrence of the lost motion between the ball screw 102 and the movable member 103 due to the reversal of the direction of the feed of the table 104, the reversal of the feed direction in the positional command Pr does not cause the table 104 to follow the positional command Pr during the lost motion zone, thereby generating a tracking error of the position of the table 104 with respect to the target position. The correction of the deviation E by means of the correction command Mr according to the present invention is for controlling or restricting the above mentioned tracking error.

The tracking error correcting part 23 holds, therein, a correction amount DA for the reversal of the feed direction from the direction as shown by the arrow A2 to the direction as shown by the arrow A1 and a correction amount −DA for the reversal of the feed direction from the direction as shown by the arrow A1 to the direction as shown by the arrow A2. The thus stored value DA or −DA of the correction amount is issued as the correction command Mr in accordance with the direction of the reversal as specified by the reversal detecting signal 22s. The correction amount DA can be determined from an actually measured amount of the lost motion.

Figure 2:
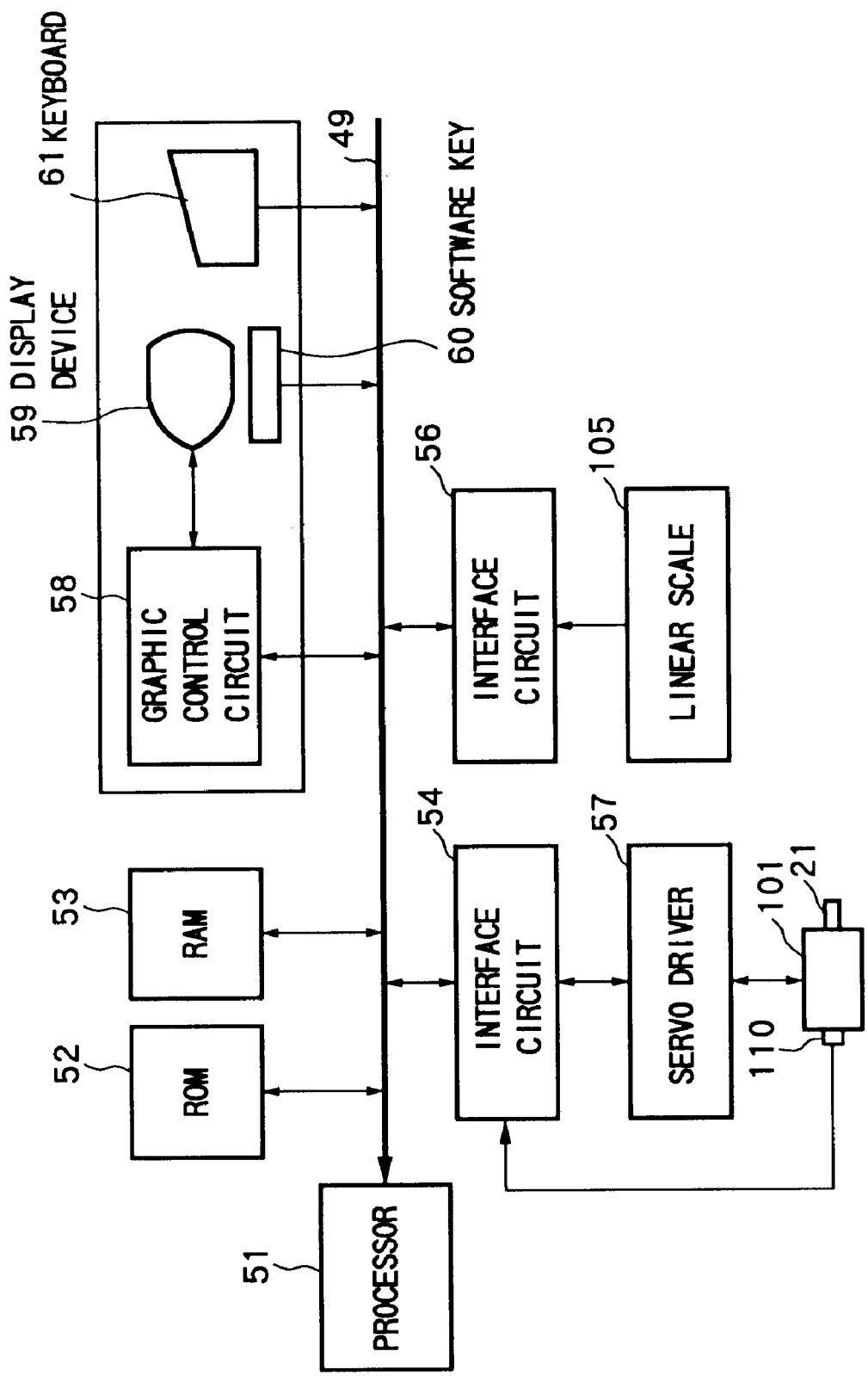
FIG. 2 is a view illustrating a hardware construction of the control device.

FIG. 2 illustrates a block diagram of the positional control device 10. In FIG. 2, a micro processor is, via a bus 49, connected to a read only memory (ROM) 52, a random access memory (RAM) 52, interface circuits 54 and 56, a graphic control circuit 58, a display device 59, a key board 61 and a software key 60. The microprocessor 51 operates in accordance with the system program stored in the ROM 52 for controlling, totally, the positional controlling device 10.

In the ROM 52, in addition to the system program, programs for obtaining the functions of the above-mentioned parts, such as the positional command generating part 11, the system variation generating part 14, the servo controlling part 15, and the correcting part 21.

The RAM 53 is for temporally storing the programs stored in the ROM 52 and various data. For example, the value of the correction amount DA for the tracking error correction part 23 is stored in the RAM 53.

The graphic control circuit 58 is for obtaining a conversion of the digital signals to the signals for displaying, which are fed to the display device 59.

The display device 59 is constructed, for example, by a cathode ray tube (CRT) type display device or a liquid-crystal display device. During a conversational programming for making a processing program by using the software key 60 or the keyboard 61, the display device 59 allows desired shapes, processing conditions and programs to be shown. Furthermore, during the input of necessary data by an operator, the display device 59 allows the input data to be shown. During the conversational programming for making the processing program, an operator effects an input of the data in accordance with the instructions shown in the display device 59 (a display screen for a conversational type data input).

On the display screen of the display device 59, menus are drawn, which illustrate various jobs to be received or data. Selection of any item in the menus is done by pressing the software key below the menu. The software key and the keyboard 61 are also used for inputting desired data to the positional controlling device 10.

The interface circuit 54 effects a conversion, of the control command to the servomotor 101 from the microprocessor 51, to a predetermined signal, which is issued to the driver 16 and effects a sequential sampling of the detecting signal 110s from the rotating position detector 110, which is issued to the processor 51. Contrary to this, the interface circuit 56 effects, at a predetermined period, a sampling of the feedback signal 105s from the linear scale 105, which is converted to a predetermined digital signal, which is issued to the microprocessor 51.

Now, a positional controlling method according to the present invention using the above mentioned positional controlling system 1 will be explained with reference to a flowchart shown in FIG. 3.

First, the positional command generating part 11 generates a positional command Pr for deciding the target position to which the table is to be moved, which positional command Pr is sequentially issued to the deviation generating part 14. See step S1 in FIG. 3.

The linear scale 105 detects the position of the table 104 and effects a feedback of the detected position Pt of the table 104 as the feedback signal 105s to the deviation generating part 14 as well as to the correction part 21. See step S2 in FIG. 3.

Then, in the deviation generating part 14, from the positional command Pr, the detected position Pt of the table 104 as being subjected to a feedback is subtracted, so as to generate a positional deviation E from the target position of the table 104. See step S3.

Then, at the following step S4, a determination is done if the reversal detecting signal 22S is made ON. The ON signal of the reversal detecting signal is obtained when the reversal in the direction of the feed in the positional command Pr is already occurred. Thus, when the backlash control is not yet effected, a result of the discrimination at the step S4 is NO and the routine goes to step S5, where it is discriminated if a reversal in the direction in the feed of the positional command Pr is occurred. If the result of the discrimination is no, a backlash control is not necessary, and the routine goes to step S6, where the positional deviation E as generated at the deviation generating part 14 is introduced into the servo controlling part 15.

At the servo controlling part 15, based on the introduced positional deviation E, a generation of a manipulated variable 15s is done. See step S6 in FIG. 3. The manipulated variable 15s is for causing the position of the table 104 to follow the target position. The manipulated variable 15s is output to the driver 16.

At the driver 16, a driving current, which is varied in accordance with the introduced positional deviation E, is fed to the servomotor 101.

When the table 104 is moved to a position close to the end position $P_0$ or $P_1$, the positional command Pr is reversed, so that a determination at the step S5 is YES. As the result, the routine goes to step S7, where the reversal detecting signal 22S is made ON.

Thus, at the following cycle, the determination at the step S4 is now YES, so that the routine goes to step S8. At the step S8, a determination is done if the movement/stoppage signal 24S is OFF. The movement/stoppage signal 24S is usually ON, which corresponds to a moved condition of the table 104. Thus, the result of the discrimination at the step S8 is NO, which causes the routine to go to the step S9. At the step S9, discrimination is done if the table 104 is stopped at the preceding cycle. The table 104 is usually moved, so that the result of the discrimination at the step S9 is No. Thus, the routine flows into step S6, where the formation of the manipulated variable 15S during the usual moved state of the table 104 is done.

When the table 104 is moved to the end position $P_0$ or $P_1$, the table 104 is finally stopped. In this case, the result of the discrimination at the step S9 is YES, so that the routine flows into step S10, where the movement/stoppage signal 24S is made OFF and to step S11, where a correction of the positional deviation (backlash correction) is done.

At the following cycle, the movement/stoppage signal 24S is made OFF, so that a result of the discrimination at the step S8 is YES. As a result, the routine flows into a step S12, where a discrimination is done if the restart of the table 104 is detected. When the re-start of the table 104 is not yet commenced, the routine goes to step S11. Thus, the backlash correction of the deviation E is continued.

When the re-start of the table 104 is commenced due to the execution of the backlash correction, the result of the determination at the step S12 is YES. Thus, the routine goes to step S13, where the reversal detecting signal 22S is made OFF and to step S14, where the movement/stoppage signal 24S is made ON. Finally, the routine goes to step S15, where the correction command is stopped, i.e., the backlash correction of the control deviation is canceled.

Figure 4A:
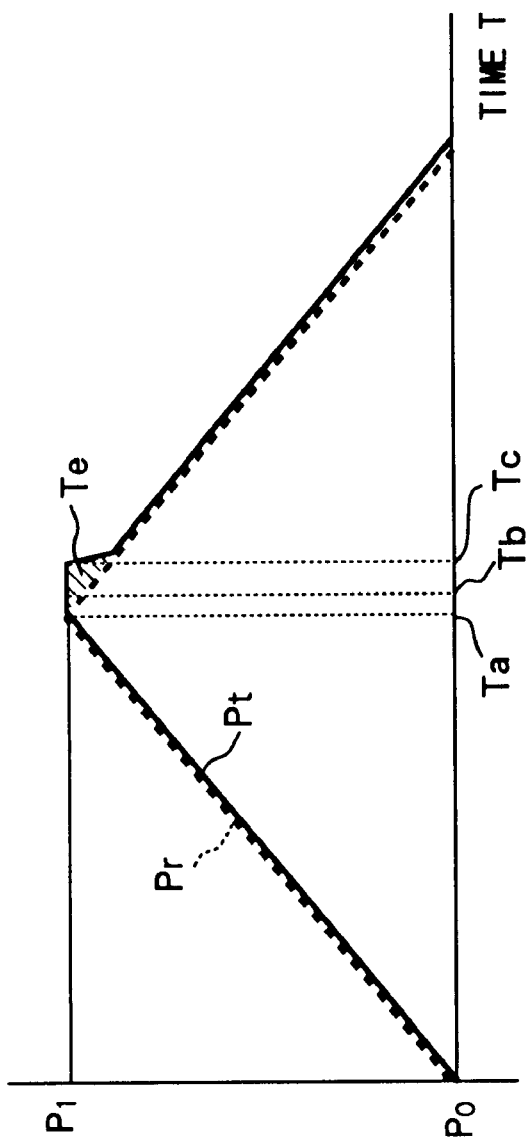
FIG. 4A is a graph illustrating a positional command in the first embodiment.

FIG. 4(a) illustrates an example of a positional command Pr, by which the table 104 is moved, at a constant speed, from a position $P_0$ to a position $P_1$, from where the direction of the feed of the table 104 is reversed and is again moved toward the position $P_0$. When a positional command Pr is generated for causing the table 104 to be moved from the position $P_0$ to the position $P_1$ as shown in FIG. 4(a), a movement of the table 104 at a constant speed is obtained in such a manner that the position Pt of the table 104 follows the positional command Pr with a steady-state deviation corresponding to a delay in the servo system.

Figure 3:
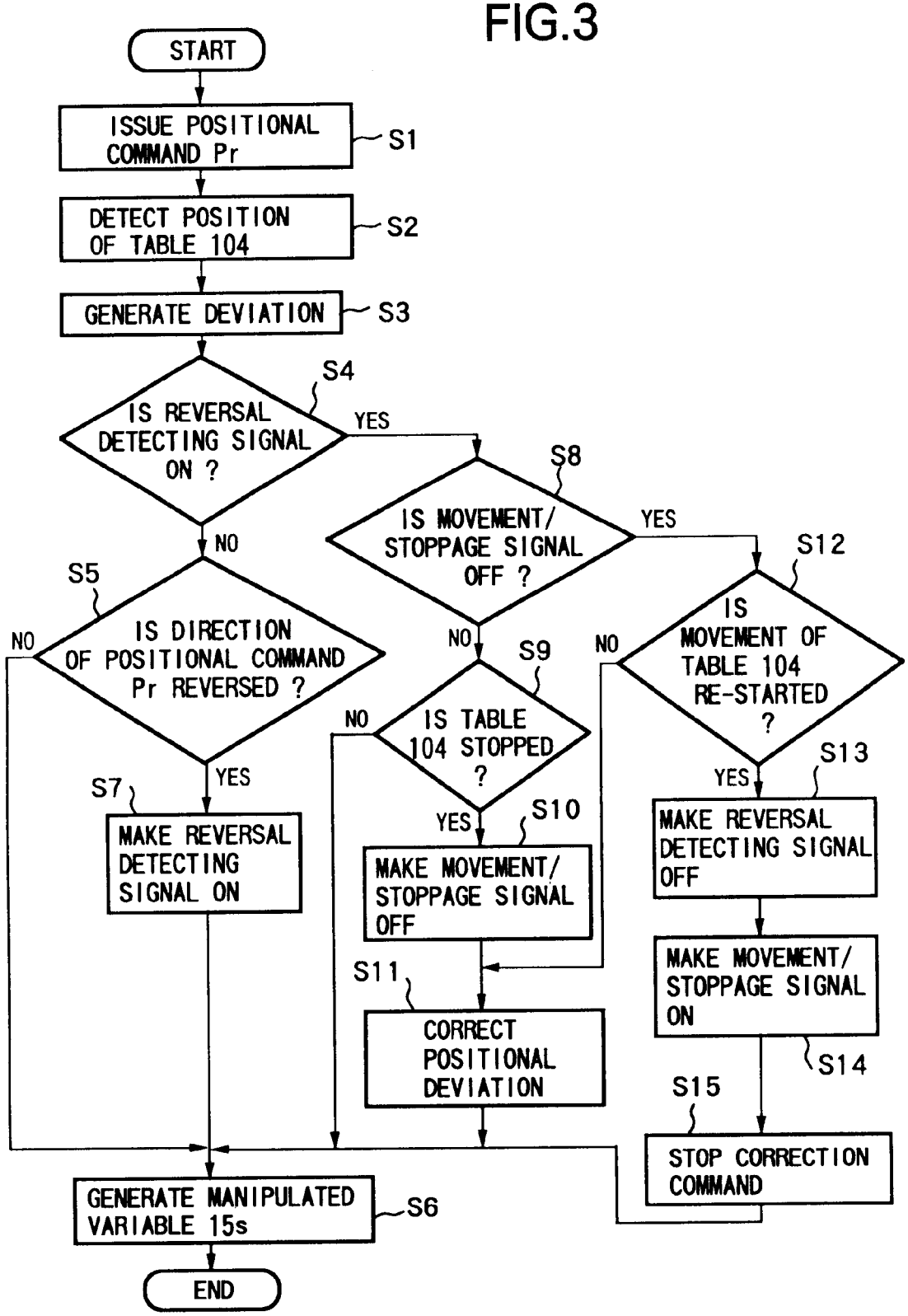
FIG. 3 is a flowchart illustrating a positional control method according to the present invention using the positional control system in the first embodiment.

When the position Pt of the table 104 is approached to the position $P_1$, a reversal in the direction of the feed in the positional command Pr is obtained (Yes result at step S5 in FIG. 3). The reversal in the direction of the feed in the positional command Pr is detected by the reversal detecting part 22 of the correction part 21, so that the reversal detecting signal 22s is issued to the tracking error correction part 23. This timing (the reversal detection timing) is shown by Ta in FIG. 4(a).

After the reversal of the direction of the feed in the positional command Pr, the table 104 comes to the position $P_1$, where a stoppage of the table is obtained. The movement/stoppage detecting part 24 detects the stopped condition of the table 104 based on the feedback signal 105a input to the part 24 from the linear scale 105, so that the movement/stoppage signal 24s is made OFF and is issued to the tracking error correcting part 23 (see step S10 in FIG. 3). This timing corresponds to the movement stopping point Tb in FIG. 4(a).

Upon the input of the reversal detecting signal 22s at the timing Ta and the movement/stoppage signal 24s at the timing Tb, the tracking error correction part 23 issues a correction amount DA as a correction command Mr to the deviation generating part 14, so that a correction in the positional deviation E is obtained (step S11 in FIG. 3).

FIGS. 5(a) and 5(b) illustrate the backlash control in the prior art. The deviation is merely gradually increased as shown by line L in FIG. 4(b) from the reversal detecting timing Ta Thus, an increased tracking error Te of the position Pt of the table 104 with respect to the positional command Pr is obtained. Furthermore, since the deviation E is merely gradually increased, a large delay in the re-start detection timing Tc is generated, where a reversed movement of the table 104 from the position P1 to P0 is re-started.

Figure 4B:
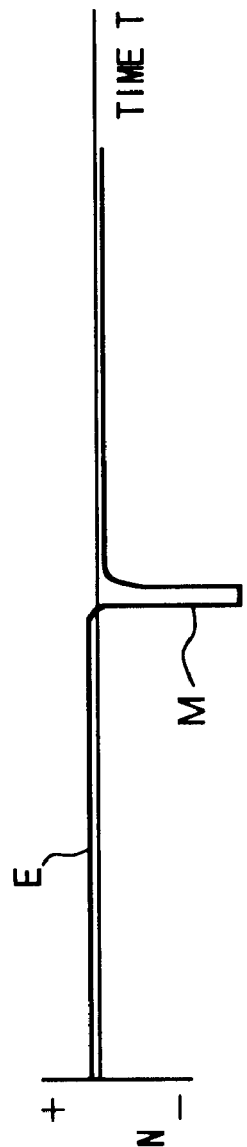
FIG. 4B is a graph illustrating a positional deviation in the first embodiment.

Contrary to this, in FIG. 4(b) according to the present invention, the tracking error correction part 23 generates a correction amount DA as a positional correction command Mr, which is issued to the system variation generating part 14 and which is added to the positional deviation E (step S11 in FIG. 3), so that, from the stoppage detection timing Tb, a rapid increase in the positional deviation E is obtained as shown by a line M. As a result of such a rapid increase in the positional deviation E as shown by the line M, a quick acceleration of the servomotor 101 is obtained. As a result, the ball screw shaft 102 can pass the lost motion phase more quickly. Namely, in FIG. 4(a), the timing of the detection of the restart according to the present invention is illustrated by Tc, which is earlier than Tc in FIG. 6(a) in the prior art.

When the movement of the table 104 from the position $P_1$ to $P_2$ is restarted as a result of the reversal of the direction of the feed in the table 104, the movement/stoppage detecting part 24 detects the restart of the movement of the table 104 based on the change in the feedback signal 105s from the linear scale 105 (YES result at step S12 in FIG. 3) and issues, to the tracking error correcting part 23, a signal 24s indicating the moved condition.

When the re-start of the table 104 is detected, the output of the correction command Mr to deviation generating part 14 from the tracking error correcting part 23 is terminated (see step S15 in FIG. 3). As a result, a correction in the tracking error upon the reversal in the direction of feed of the table from the position $P_1$ to the position $P_2$ is completed.

In short, in this embodiment of the present invention as explained above, a correction in the control deviation E upon the reversal of the table 104 is done in such a manner that, after the direction of the feed in the positional command Pr is detected (YES result of the step S5 in FIG. 3) as well as a stoppage of the table 104 is detected (YES result of the step S9 in FIG. 3), a correction of the positional deviation E is done by the correction command Mr (step S11 of FIG. 3) and that such a correction of the deviation E by the correction command Mr is ceased when the re-start of the movement of the table 104 is detected (YES result at step S12). As a result of this operation, a tracking error Te as generated by a lost motion during the reversal in the feed of the table 104 is reduced.

Furthermore, according to the present invention, during the stoppage of the table 104, the control deviation E does not include any change in the feedback signal 105s of the linear scale 105. Thus, any modification of the information as to the position of the table 105 does not occur. Thus, any offset is generated in the position Pt of the table 104 with respect to the positional command Pr when a positioning of the table to the predetermined position P1 or P0 is done.

Second Embodiment

FIG. 6 illustrates a construction of a position control system according to a second embodiment of the present invention. In FIG. 6, the parts corresponding to those in the position control system according to the first embodiment use the same reference numerals.

The difference of the position control system according to the second embodiment with the position control system according to the first embodiment resides in a deviation generating part 210 and a correction part 201. In more detail, the feedback signal 110s from an optical or electromagnetic type rotating position sensor 110 mounted to the servomotor 101 is input to the positional deviation generating part 201.

A hardware construction of the positional control device 200 according to this embodiment is substantially similar to that as explained with reference to FIG. 2 except that an interface circuit is provided for inputting the feedback signal from the rotating position detector 110 to the positional control device 200. The rotating position of the servomotor 101 detected by the rotating position sensor 110 is an example of a detected driven position according to the present invention.

The deviation generating part 210 is provided with a transformation part 216, a positional error calculating part 215, a filter part 214, a subtractor part 213 and a positional deviation calculating part 211.

The transformation part 216 transforms the feedback signal 110s from the rotating position detector 110 detecting a rotating position of the servomotor into a position Pm of the table 104 and issues the transformed rotating position Pm into the subtractor part 213.

The positional error calculating part 215 calculates a positional error Pe between a rotating position of the servomotor 101 transformed at the transforming part 216 and a detected position Pt of the table 104 determined by the feedback signal 105s from the linear scale 105 and issues the positional error Pe into the filter part 214.

The filter part 214 effects a smoothing of the positional error Pe by subjecting the latter to a first order lag filtering treatment and issues the smoothed positional error Pe to the position calculating part 212.

The subtractor part 213 subtracts, from the transformed position Pm issued from the transforming part 216, of a correction command Mr issued from the correcting part 201 to obtain a corrected position Ps, which is issued to the deviation calculating part 212 as well as to the positional error calculating part 215.

The position calculating part 212 adds the smoothed positional error Pe issued from the filtering part 214 to the corrected position Ps which is issued from the subtractor part 213 to obtain substantial position Pt of the table 104, which is issued to the positional deviation calculating part 211.

The positional deviation calculating part 211 subtract, from the positional command Pr issued from the positional command generating part 11, the substantial position Ptr of the table 104 issued from the position calculating part 212 in order to obtain the positional deviation E.

The correcting part 201 is constructed by the reversal detecting part 22, the movement/stoppage detecting part 24 and the tracking error correcting part 203. The reversal detecting part 22 and the movement/stoppage detecting part 24 are of the same constructions as those in the first embodiment as already explained.

The tracking error correcting part 203 issues to the subtractor part 213 a correction command Mr for correcting the rotating position Pm detected by the servomotor 101. In this case, in accordance with the reversal detecting signal 22s from the reversal detecting part 22 and the movement/stoppage detecting signal 24 from the movement/stoppage detecting part 24, the tracking error correction part 203 operates to vary (increases or decreases) a correction amount for correcting a rotating position Pm detected by the servomotor 101 in such a manner that a tracking error of the table 104 with respect to the positional command Pr as generated by the reversal in the direction of the feed is controlled.

In more detail, the tracking error correcting part 203 issues, to the subtractor part 213, a predetermined correction amount B as a correction command M, which is always used for a correction of the rotating position Pm as detected by the servomotor 101.

When a reversal in the direction of the feed in the positional command Pr is detected by the reversal detecting part 22 and when a stopped condition of the table 104 is detected by the movement/stoppage detecting signal 24S, the tracking error correction part 203 effects a periodical modification of the correcting amount B for a predetermined amount DB, a correction at a predetermined time interval, which is expressed by the following equation, $$B=B+DB \quad (1),$$

and the modification of the correction amount is ceased when the re-start of the movement of the table 104 is detected.

The above equation (1) is applied when the reversal of the direction of the feed is generated from the positive direction to the negative direction. Suppose that the value of the correction amount B is B1 at a timing just prior to the detection of the reversal of the direction of the feed and the detection of the stoppage of the table and, also, suppose that, after the detection of the reversal of the direction of the feed and the detection of the stoppage of the table 104, periodical corrections of N times of the correction amount B by the modification amount DB as expressed by the equation (1) are done until the detection of the re-start of the movement of the table 104. In this case, the correction amount B is modified to B2, which is expressed by B2=B1+N'DB.

The modification of the correction amount B in a reversal in the direction of the feed in the positional command Pr from the negative direction to the positive direction is as follows. Namely, when a reversal of the direction of the feed in the positional command Pr is detected by the reversal detecting part 22 and a stopped condition of the table 104 is detected by the movement/stoppage signal 24s, a periodical modification of correcting amount B by a predetermined amount DB, which is expressed by the following equation, $$B=B-DB \quad (2),$$

is done and the modification of the correction amount is ceased when the re-start of the movement of the table 104 is detected.

The value of the correction amount B is B2 as above mentioned at a timing just prior to the detection of the reversal of the direction of the feed and the detection of the stoppage of the table. After the detection of the reversal of the direction of the feed and the detection of the stoppage of the table 104, periodical corrections of N times of the correction amount B by the modification amount DB as expressed by the equation (2) are done until the detection of the re-start of the movement of the table 104. In this case, the correction amount B is equalized to B1.

FIG. 8 schematically illustrates a change in the correction amount as a result of the execution of the above control. Upon a reversal of the direction of the feed from the positive direction of the negative direction, a step like increase of DB in the correction amount B is obtained for every timings (time interval of dt) during the backlash correction period P1 until a value B2 is finally obtained. During a normal period P2, the correction amount is unchanged due to the fact the backlash correction is not done. In case where, the reversal in the direction of the feed is occurred from the negative direction to the positive direction, a step like decrease of DB in the correction amount B is obtained for every timings during the backlash correction period P3 until the value B1 is finally obtained.

Now, a positional control according to the present invention using the above mentioned positional control system will be explained with reference to a flowchart in FIG. 7.

Figure 7:
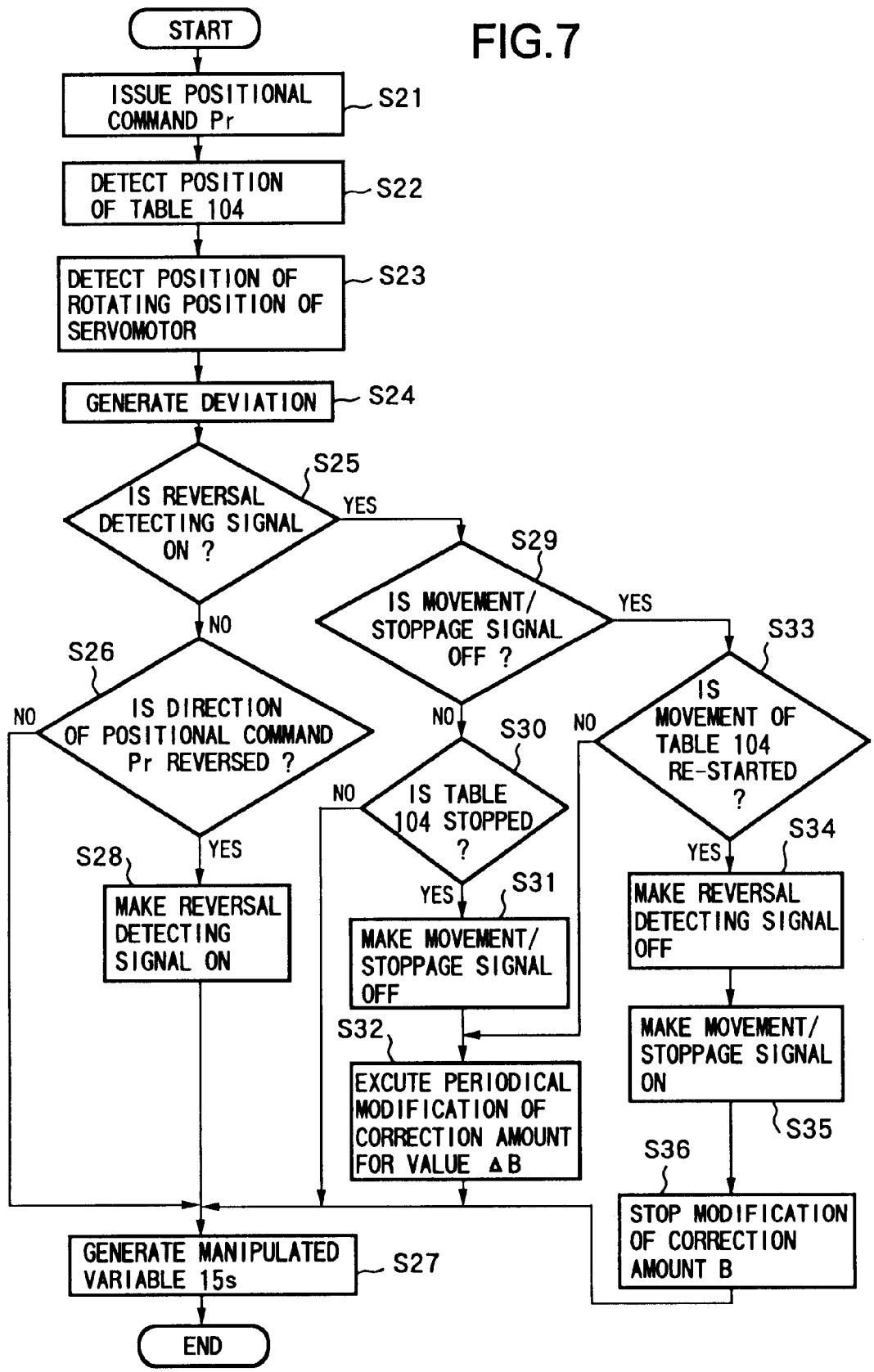
FIG. 7 is a flowchart illustrating a positional control method according to the present invention using the positional control system in the second embodiment.

First, the positional command generating part 11 generates a positional command Pr, which is fed to the deviation generating par 211 (step S21 in FIG. 7). The linear scale 105 detects a position of the table 104 and effects a sequential feedback of a feedback signal 105c as the detected position Pr of the table 104 to the deviation generating part 210 as well as to the correction part 201 (step S22 in FIG. 7). Furthermore, the rotating position detecting sensor 110 connected to the servomotor 101 effects a sequential feedback of the feedback signal 110s to the deviation generating part 210 (step S23 in FIG. 7).

The deviation generating part 210 generates a deviation E from the positional command Pr as introduced and the feedback signals from the linear scale 105 and rotating position sensor 110 as well as (step S24 of FIG. 7).

Then, at the following step S25, a determination is done if the reversal detecting signal 22S is made ON. The ON signal of the reversal detecting signal is obtained when the reversal in the direction of the feed in the positional command Pr is actually reversed. Thus, when the backlash control is not yet effected, a result of the discrimination at the step S25 is NO and the routine goes to step S26, where it is discriminated if a reversal in the direction in the feed of the positional command Pr is occurred. If the result of the discrimination is no, i.e., a backlash control is not necessary, and the routine goes to step S27, where the positional deviation E as generated at the deviation generating part 14 is introduced into the servo controlling part 15.

The servo control part 15 generates, based on the introduced positional deviation, a manipulated variable 15s for causing the position of the table 104 to follow to the target position (step S27), which is input to the driver 16. The driver 16 feeds, in accordance with the manipulated variable 15s, a driving current to the servomotor 101, thereby effecting a tracking control of the servomotor by means of the manipulated variable 15s.

When the table 104 is moved to a position close to the end position $P_0$ or $P_1$, the positional command Pr is reversed, so that a determination at the step S26 is YES. As the result, the routine goes to step S28, where the reversal detecting signal 22S is made ON.

Thus, at the following cycle, the determination at the step S25 is now YES, so that the routine goes to step S29. At the step S29, a determination is done if the movement/stoppage signal 24S is OFF. The movement/stoppage signal 24S is usually ON corresponding to moved condition of the table 104. Thus, the result of the discrimination at the step S29 is NO, which causes the routine to go to the step S30. At the step S30, a discrimination is done if the table 104 is stopped at the preceding cycle. The table 104 is usually moved, so that the result of the discrimination at the step S30 is No. Thus, the routine flows into step S27, where the formation of the manipulated variable 15S during the usual moved state of the table 104 is done.

When the table 104 is moved to the end position $P_0$ or $P_1$, the table 104 is finally stopped. In this case, the result of the discrimination at the step S30 is YES, so that the routine flows into step S30, where the movement/stoppage signal 24S is made OFF and to step S32, where a correction of the positional deviation (backlash correction) is done by a periodical step like increase or decrease of a value DB in the correction amount as illustrated in FIG. 8.

At the following cycle, the movement/stoppage signal 24S is made OFF, so that a result of the discrimination at the step S29 is YES. As a result, the routine flows into a step S33, where the restart of the table 104 is detected. When the re-start of the table 104 is not yet commenced, the routine goes to step S32. Thus, the backlash correction of the deviation E by a periodical step like increase or decrease of a value DB in the correction amount.

When the re-start of the table 104 is commenced due to the execution of the backlash correction, the result of the determination at the step S33 is YES. Thus, the routine goes to step S34, where the reversal detecting signal 22S is made OFF and to step S35, where the movement/stoppage signal 24S is made ON. Finally, the routine goes to step S36, where the correction command is stopped, i.e., the backlash correction of the control deviation is canceled.

Suppose that a positional command as shown in FIG. 4(a) is generated. In this case, the table 104 is, first, moved from the position $P_1$ to $P_2$. When the position Pt of the table 104 is approached to the position $P_1$, a reversal in the direction of feed of the positional command Pr is generated. This reversal of the direction of the feed of the positional command Pr is detected by the reversal detecting part 22 of the correction part 201 (YES result at step S26) and issues the reversal signal 22s.

After the reversal of the feed in the positional command Pr, the position Pt of the table 104 is finally reached to the position $P_1$, which causes the table 104 to be stopped. The movement/stoppage detection part 24 detects the stopped condition of the table 104 based on the feedback signal 105s from the linear scale 105, so that a movement/stoppage signal 24s illustrating the stopped condition is issued to the tracking error correction part 203 (step S31 in FIG. 7).

The detection of a reversal of the direction in feed of the table 104 as well as the detection of the stoppage of the table 104 cause the tracking error correcting part 203 a correction amount B to be issued to the subtractor part 213, while a modification (increase) for a predetermined amount B is periodically effected to the correction amount B, thereby effecting a correction of the rotating position Pm of the servomotor 101 after subjected to a transformation at the transforming part 216.

As a result, a step-like increase in the correction amount B is obtained as shown in FIG. 8, which cause the rotation speed of the servomotor 101 to be increased, thereby allowing the ball screw shaft 102 to be quickly passed the lost motion area. As a result, a reduction of the tracking error of the position of the table 104 with respect to the positional command Te is obtained.

When a passage of the lost motion area of the ball screw shaft 102 is obtained, the movement of the table 104 is re-started, which causes the feedback signal 105s of the linear scale 105 to be varied, resulting in a detection of the restart of the table 104 as detected by the movement/stoppage detecting part 24 (YES result at step S33 in FIG. 7). When the re-start of the movement of the table 104 is detected, the modification of the correcting amount B is canceled (step S36 in FIG. 7) and the correction of the rotating position Pm of the servomotor is done by the correcting amount B after the modification. As a result, the correction in the tracking error as generated upon the reversal in the direction of the feed of the table is completed.

The movement of the table 104 from the position $P_1$ to the position $P_0$ causes, finally, the table 104 to be moved to a position adjacent the position $P_0$. In the similar way, a reversal in the direction of the feed in the positional command Pr is, first, detected. Then, the stoppage of the table 1 is detected, which allows the correction amount B to be modified (reduced), thereby carrying out the correction in the similar way.

In short, in this embodiment of the present invention, where a feedback not only of the position of the table 104 but also of the rotating position of the servomotor 104 is executed, a control of a tracking error Te as generated upon the reversal in the direction of the feed of the table 104 is, also, attained.

Furthermore, according to this embodiment, a correction of the feedback signal 110s of the rotating position sensor 110 detecting the rotating position of the servomotor 101 is done and any correction in the feedback signal 105s of the linear scale 105 is not done. Thus, when the table 104 is positioned to the predetermined position $P_0$ or $P_1$, any offset is not generated in the position Pt of the table 104 with respect to the positional command Pr.

Furthermore, in this embodiment, during period which is started by the detection of the reversal in the direction of the feed of the positional command Pr as well as the detection of the stoppage of the table 104, a modification of the correction amount in step like increase or decrease for an predetermined value of DB is obtained. Contrary to this, by employing a full change in the correction amount, the table 104 may accidentally spaced form the desired trajectory of the positional command Pr. Namely, an inward displacement may be likely at quadrantal switching position. However, according to the present invention, the periodical step-like increase or decrease for a predetermined value DB can obviate the above mentioned problem.

In the second embodiment as illustrated above, a periodical step-like increase or decrease of a predetermined amount DB in the correction amount B is obtained when a direction of the feed is reversed as shown in FIG. 8. However, as a modification, as the similar the first embodiment in FIGS. 1 to 5, a full amount correction of an amount of ±DA can be done in the feedback signal 110s from the rotating position sensor 110 during the backlash control period which starts with the detection of the reversal in the direction of the feed in the positional command Pr as well as the detection of the stoppage of the table 104 and which ends with the detection of the re-start of the movement of the table 104.

While the invention has been described with reference to specific embodiment chosen for purpose of illustration, it should be apparent that numerous modifications could be made thereto by those skilled in the art without departing from the basic concept and scope of the invention.

What is claimed is:

1. A positional control system for controlling a position of a controlled object, comprising:

a driving means connected to the controlled object;

a setting means for setting a variable target position of the controlled object;

a control command generating means for generating a control command in accordance with said variable target position;

a position sensor arranged on said controlled object for detecting a position of the controlled object;

a deviation generating means for generating a deviation between said control command and a detected position of the controlled object;

a servo control means for generating, in accordance with the deviation, a manipulated variable issued to said driving means for causing said controlled object to follow said variable target position; and, a tracking error correction means operated from a first time at which a direction in the feed in the variable target position is reversed and the controlled objected is stopped to a second time at which the movement of the controlled object is re-started, for correcting a lost movement for a mechanical non-linear position error caused by a mechanical coupling of the controlled object and the driving means, which appears at the restart time after the stop.

2. A system according to claim 1, wherein said tracking error correction means comprise:

a reversal detector part detecting a reversal in direction of feed;

a movement/stoppage detector part for detecting a movement or stoppage of the controlled object; and, a tracking error correcting part for issuing a correcting amount for correcting a correction amount of the lost movement in accordance with signals from said reversal detector and said movement/stoppage detector.

3. A system according to claim 2, wherein said tracking error correcting part holds, in accordance with the direction of the reverse of the feed, a first and second correction amounts of the lost movements having opposed signs and the same absolute value.

4. A system according to claim 2, wherein said movement/stoppage detector part detects the movement or the stoppage of the controlled object based on the signal from said position sensor.

5. A positional control system for controlling a position of a controlled object, comprising:

a driving means connected to the controlled object;

a setting means for setting a variable target position of the controlled object;

a control command generating means for generating a control command in accordance with said variable target position;

a first position sensor arranged on said controlled object for detecting a position of the controlled object;

a second position sensor arranged on said driving means for detecting a driving position of the driving means;

a deviation generating means for generating control deviation of the controlled object in accordance with said control command, the detected position of the controlled object and detected driving position of the driving means;

a servo control means for generating, in accordance with the control deviation, a manipulated variable issued to said driving means for causing said controlled object to follow said variable target position; and, a tracking error correction means operated from a first time at which a direction in the feed in the variable target position is reversed and the controlled objected is stopped to a second time at which the movement of the controlled object is re-started, for correcting a lost movement for a mechanical non-linear position error caused by a mechanical coupling of the controlled object and the driving means, which appears at the restart time after the stop.

6. A system according to claim 5, wherein said tracking error correction means comprise:

a reversal detector part detecting a reversal in direction of feed;

a movement/stoppage detector part for detecting a movement or stoppage of the controlled object, and;

a tracking error correcting part for increasing or decreasing a correcting amount for correcting a correction amount of the lost movement in accordance with signals from said reversal detector part and said movement/stoppage detector part.

7. A system according to claim 5, wherein said tracking error correcting part effects a periodical modification of a predetermined amount of the correcting amount for correcting the detected driving position when a reversal in the direction of the feed is detected by the reversal detecting part and when the stoppage of the controlled object is detected by said movement/stoppage detector part, said modification being ceased when a re-start of the controlled object is detected by said movement/stoppage detector part.

8. A system according to claim 5, wherein said movement/stoppage detector part detects the movement or the stoppage based on the signal from said position sensor.

9. A position control method for controlling a position of a controlled object, connected to a driving means comprising the steps of:

setting a variable target position of the controlled object;

generating control command in accordance with said variable target position;

detecting a position of the controlled object by said position sensor arranged on the controlled object;

generating a deviation between said control command and a detected position of the controlled object;

effecting a servo-control by generating, in accordance with the deviation, a manipulated variable issued to said driving means for causing said controlled object to follow said variable target position, and;

correcting a lost movement for a mechanical non-linear position error caused by a mechanical coupling of the controlled object and the driving means, which appears at a restart time after a stop during the period from a first time at which a direction in the feed in the variable target position is reversed and when the controlled objected is stopped to a second time at which the movement of the controlled object is re-started.

10. A method according to claim 9, wherein said tracking error correcting step comprise the steps of:

detecting a reversal in direction of feed;

detecting a stoppage of the controlled object;

correcting said lost movement when a reversal in the direction of the feed and the stoppage of the controlled object are detected, and:

ceasing the correction when a re-start of the controlled objection is detected.

11. A method according to claim 10, wherein said step for correcting the tracking error detects a correction of said controlled deviation by a first or second correction lost movement amount of opposed signs of the same absolute vales which are determined in accordance with the direction of the reversal in the feed.

12. A method according to claim 10, wherein said step for detecting the stoppage and said step for detecting the re-start comprise steps of detecting the stopped and the moved conditions of the controlled object in accordance with the detected signal from the position sensor.

13. A position control method for controlling a position of a controlled object, connected to a driving means comprising the steps of:

setting a variable target position of the controlled object;

generating control command in accordance with said variable target position;

detecting a position of the controlled object by said position sensor arranged on the controlled object;

detecting a driving position of the driving means by the driving position sensor;

generating a deviation from said control command and a detected driving position of the driving means;

effecting a servo-control by generating, in accordance with the deviation, a manipulated variable issued to said driving means for causing said controlled object to follow said variable target position, and;

modifying correcting amount for correcting a lost movement for a mechanical non-linear position error caused by a mechanical coupling of the controlled object and the driving means, which apprears at a restart time after a stop during the period from a first time at which a direction in the feed in the variable target position is reversed and the controlled objected is stopped to a second time at which the movement of the controlled object is re-started.

14. A method according to claim 13, wherein said tracking error correcting step comprise the steps of:

detecting a reversal in direction of feed;

detecting a stoppage of the controlled object;

increasing or decreasing the correction amount for correcting said detected driving position when a reversal in the direction of the feed as well as the stoppage of the controlled object are detected, and:

ceasing the modification of the correction amount when a re-start of the controlled objection is detected.

15. A method according to claim 13, wherein said step for correcting the tracking error detects a periodical modification of a predetermined amount of the correcting amount for correcting the detected driving position when the reversal in the direction of the feed and the stoppage of the controlled object, said modification of the correcting amount being ceased when the restart of the controlled object is detected.

16. A method according to claim 13, wherein said step for detecting the stoppage and said step for detecting the re-start comprise steps of detecting the stopped condition and the moved condition in accordance with the detected signal from the position sensor.

* * * * *